United States Patent Office 2,858,802
Patented Nov. 4, 1958

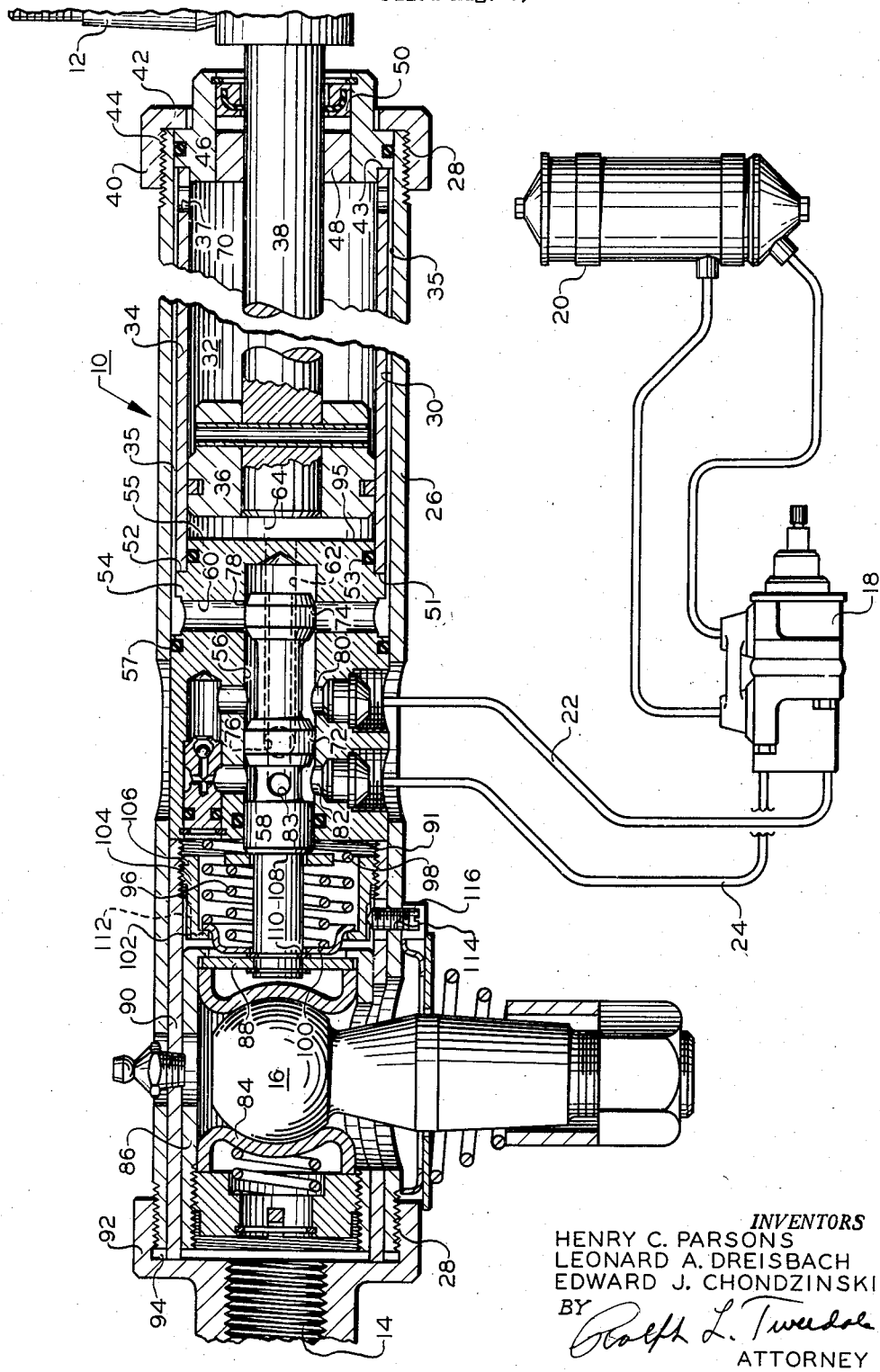

2,858,802

POWER TRANSMISSION

Henry C. Parsons, Grosse Point, Leonard A. Dreisbach, Dearborn, and Edward J. Chondzinski, Detroit, Mich., assignors to Vickers Incorporated, Detroit, Mich., a corporation of Michigan Application August 3, 1955, Serial No. 526,102

10 Claims. (Cl. 121—38)

This invention relates to power transmissions, and is particularly applicable to those of the type comprising two or more fluid pressure energy translating device, one of which may function as a pump and another as a fluid motor.

More specifically the invention relates to power transmissions adapted for use in servo applications, such as power steering the dirigible wheels of a vehicle.

Power steering devices are generally installed under the vehicle, where they are tied into the steering linkage. Because of their exposed location, they are subjected to hard bumps in rough terrain and to impact damage from flying stones and other objects. External connection tubing may be damaged, or torn loose, by these impacts. Dents in the cylinder wall may jam the piston and render the device inoperative. Also, the factory-centered, hydraulically neutral, position of the control valve may be disturbed, thus destroying nicety of control. Repairs are often complicated by corrosion and damage to fasteners, making disassembly difficult, and by complex design.

The above difficulties are some of the many which cause steering booster trouble in vehicle installations. Prior art devices have been susceptible to such malfunction by reason of external motor conduits, exposed assembly bolts which become corroded and battered in service, unprotected cylinder walls, and inaccessibility of valve spool centering adjustments, when provided.

It is an object of this invention to provide an improved, low cost steering booster which is rugged, compact, easy to disassemble for repairs, and in which the control valve centered position is easily adjustable from the booster exterior, while installed in a vehicle.

Further objects and advantages of the present invention will be apparent from the following description, reference being had to the accompanying drawing wherein a preferred form of the present invention is clearly shown.

In the drawing, the single figure illustrates a steering booster embodying the present invention. The booster generally designated 10 is a linear movement servomotor of the integral type; that is, the type having the fluid motor and valve in an integral assembly; and is provided with an anchor connection 12, an output connection 14, and an input member 16. When installed in a vehicle, the input member 16 is connected to the Pitman arm, the anchor connection 12 is secured to the vehicle frame, and the output connection 14 is secured to the drag link of the steering mechanism.

Pressure fluid for the operation of the booster is provided by a pump 18 which is supplied with fluid by a reservoir 20 and delivers that fluid at increased pressure through a conduit 22. A fluid return conduit 24 leads from the booster to the inlet zone of the pump 18.

The steering booster 10 has an outer sleeve member 26 which extends substantially the full length of the booster. Sleeve 26 has external threads 28 at each end, and a central bore, or opening, 30 extending longitudinally therethrough.

A fluid motor generally designated 32, having a cylinder 34, is telescopically disposed in the longitudinal opening 30 of sleeve 26. The outside diameter of cylinder 34 is somewhat less than the inside diameter of sleeve 26, so as to provide an annular fluid passage 35, which communicates through holes 37 with the interior of cylinder 34. The clearance space between the walls of sleeve 26 and cylinder 34 also protects the cylinder 34 from external impact. A piston 36 is slidable in the operating cylinder 34 and has a rod 38 extending therefrom. The operating cylinder 34 is retained in the opening 30 by an end cap 40 having threads engaging the threads 28 at the outer end of sleeve 26. Sandwiched between a flange 42 on cap 40 and the outer end 43 of cylinder 34, is the shoulder 44 of a head member 46. Head 46 includes a bushing 48 and a seal 50 for the rod 38. The inner end 51 of the operating cylinder 34 abuts a shoulder 52 on a control valve body 54. A seal 53 on a pilot 55 prevents leakage from the inner end of cylinder 34 at its juncture with valve body 54.

Valve body 54 slideably engages the bore 30 of outer sleeve 26. A seal 57 encircles the periphery of the valve body 54 and prevents leakage from the annular fluid passage 35.

The valve body 54 includes a bore 56 having a control valve spool 58 therein. The lands of valve spool 58 and the ports of valve body 54 are so arranged to provide conventional open center type valving. The valve body 54 includes a pair of motor passages 60 and 62. Passage 62 communicates with a working chamber 64 at the inner end of cylinder 34 and passage 60 communicates with the working chamber 70 through the annular passage 35, between sleeve 26 and cylinder 34, and the radial holes 37. Passage 35 thus eliminates need for the usual external connection to the remote end of the cylinder. The valve spool 58 has a pair of valving lands 72 and 74 thereon. Valving lands 72 and 74 control motor ports 76 and 78, which communicate with motor passages 62 and 60, respectively. A pressure port 80 communicates with the delivery conduit 22 and a return port 82 connects with the return conduit 24.

In the centered position of spool 58, as illustrated, an open center condition exists. Pressure port 80 is in fluid communication with the return port 82 across the land 72 and across the land 74 and through the central spool bore and cross passage 83. It is apparent that working chambers 64 and 70 are also connected to return port 82. In the centered position of spool 58 no steering force is exerted by the booster. Movement of the valve 58 in either direction will cause a pressure increase in one of the working chambers 64 or 70, in a manner well known in the art, thus producing hydraulic steering force.

The input member 16 includes a ball and socket joint 84 supported in a slide 86. The input member is connected to the valve spool 58 through a washer 88. A cylindrical guide sleeve 90 is telescopically disposed in the opening 30 of sleeve 26 so as to abut the end face 91 of the valve body 54. An end cap 92, which carries the output connection 14, is coupled to the threads 28 at the end of the outer sleeve 26.

The telescopically disposed parts in the sleeve 26, namely; head 46, cylinder 34, valve body 54, and guide sleeve 90, are so proportioned that the stack length of their abutting portions exceeds the length of sleeve 26 by a slight amount, as indicated at 94. It will be seen that when the various components are inserted in the sleeve 26 and the end caps 40 and 92 are tightened on threads 28, the sandwiched parts will be securely compressed together with a force equal to the tensile force in sleeve 26 and will be retained in the sleeve 26.

When valve 58 is shifted rightwardly, the resulting increased fluid pressure in working chamber 70 reacts against the vehicle frame through anchor connection 12, and acts on the inner face of head 46 to produce a steering force which shifts the entire cylinder and sleeve assembly rightwardly. This steering force is transmitted to the output connection 14 through outer sleeve 26 as a tensile force. As was heretofore noted, the final assembly operation of tightening end caps 40 and 92 created a tensile force in sleeve 26. There is thus no undesirable reversal of stress or increase from zero to a maximum. There is only a change in magnitude.

Similarly, when valve 58 is shifted leftwardly, the resulting increased fluid pressure in working chamber 64 reacts against the vehicle frame through anchor connection 12, and acts on the face 95 of valve body 54 to produce a steering force which shifts the entire cylinder and sleeve assembly leftwardly. This steering force is transmitted to the output connection 14 through the valve body 54 and guide sleeve 90 as a compressive force. Since the final assembly operation produced compressive force in those parts, there is thus no reversal of stress, or increase from zero to a maximum in even a full reversal of steering force.

Spool 58 is biased to the centered position by a pair of nested biasing springs 96 and 98. Spring 98 acts between the valve body 54 and a dished washer 100 to bias the washer 100 against the shoulder 102 of a sleeve 104. The inner spring 96 acts between the dished washer 100 and an abutment 108 on spool 58, to bias the shoulder 110, carried by spool 58, into abutment with washer 100. The spring centered position of spool 58 is thus established by the location of shoulder 102.

It is important in such valves that the centering means act to restore the valve to precisely the effective neutral position, otherwise improper steering will result. If the centered position of the valve is not adjustable, machining tolerances must be very closely controlled, thus making the valve expensive to manufacture. Further, during severe service conditions and after long use the original centered position may no longer by hydraulically neutral. Provisions made in the past for centering adjustments have been complex and difficult to manipulate, often requiring a number of operations.

Further, where the integral type of booster was suspended between an anchor point at one end and an output member at the other end, it was necessary in the past to dismount the booster from the steering linkage assembly before adjustment of the pilot valve could be accomplished. Initial adjustment at the factory before installation was a simple matter. However, when the valve needed adjustment after being put in service, it was a time consuming task, since in many installations the booster is welded into the steering linkage. The centering adjustment is easily and quickly made on the steering booster of the present invention.

Sleeve 104 is threaded to the interior of guide sleeve 90 at 106, and is provided with a circumscribing band of axially disposed teeth, or serrations, at 112. An access hole 114 has a threaded portion extending through the outer sleeve 26, and continues through the guide sleeve 90. A set crew 116 is threaded into the access hole 114 and its tip is proportioned to engage the teeth 112. Thus, with set screw 116 in place, the access hole is closed and the sleeve 104 is locked against rotation.

To adjust the spring centered position of spool 58 it is only necessary to remove set screw 116, insert a tool suitable to engage teeth 112, and rotate the sleeve 104. Abutment 102 will, of course, translate axially with sleeve 104 thus shifting the normal center position of spool 58. Note that this adjustment can be made easily and quickly and with the booster still installed in the vehicle. When adjustment is completed it is only necessary to replace screw 116 to both lock the adjustment and close the access hole.

It will be seen that there has been provided an improved, low cost steering booster which is rugged, compact, easy to disassemble, and in which the control valve centered position is firmly locked but is easily adjustable from the booster exterior.

While the form of embodiment of the invention as herein disclosed constitutes a preferred form, it is to be understood that other forms might be adapted, all coming within the scope of the claims which follow.

What is claimed is as follows:

1. In a servo mechanism of the linear movement type having anchor and output connections at opposed ends thereof, a fluid motor and a control valve axially disposed substantially along a line between said connections, the valve including a body and spool, said body being secured to the motor and said spool being actuable to control the motor, and resilient means biasing the spool to a fixed position relative to the valve body, that improvement comprising: means for adjusting said fixed position without disturbing the anchor and output connections, and means including means forming an access hole extending laterally into said mechanism between said connections, an adjustment member actuable through said access hole, and removable locking means engaging said adjustment member and closing said access hole.

2. In a servo mechanism of the linear movement type having anchor and output connections at opposed ends thereof, a fluid motor and a control valve axially disposed substantially along a line between said connections, the valve including a body and spool, said body being secured to the motor and said spool being actuable to control the motor, and resilient means biasing the spool to a fixed position relative to the valve body, that improvement comprising: means for adjusting said fixed position without disturbing the anchor and output connections, said means including means forming an access hole extending laterally into said mechanism between said connections, a toothed adjustment member actuable through said access hole and removable locking means engaging the teeth of said adjustment member and closing said access hole.

3. In a servo mechanism of the linear movement type having anchor and output connections at opposed ends thereof, a fluid motor and a control valve axially disposed substantially along a line between said connections, the valve including a body and spool, said body being secured to the motor and said spool being actuable to control the motor, an external sleeve encasing both the valve and the motor and resilient means biasing the spool to a fixed position relative to the valve body, that improvement comprising: means for adjusting said fixed position without disturbing the anchor and output connections, said means including means forming an access hole extending laterally through the sleeve into said mechanism between said connections, an adjustment member actuable through said access hole, and removable locking means engaging said adjustment member and closing said access hole.

4. In a servo mechanism of the linear movement type having anchor and output connections at opposed ends thereof, a fluid motor and a control valve axially disposed substantially along a line between said connections, the valve including a body and spool, said body being secured to the motor and said spool being actuable to control the motor, an external sleeve encasing both the valve and the motor and resilient means biasing the spool to a fixed position relative to the valve body, that improvement comprising: means for adjusting said fixed position without disturbing the anchor and output connections, said means including means forming an access hole extending laterally through the sleeve into said mechanism between said connections, a toothed adjustment member actuable through said access hole and removable locking means engaging the teeth of said adjustment member and closing said access hole.

5. In a servomotor and control valve structure: an outer sleeve member having an opening extending longitudinally therethrough; an operating cylinder and a control valve body telescoped into the opening in abutting relation, said body having a motor port communicating with each end of said cylinder; and end caps secured to opposite ends of said sleeve, forming opposed abutments between which said cylinder and valve body are sandwiched, said end caps functioning to maintain said abutting relation and to retain said cylinder and valve body in said opening.

6. In a servomotor and control valve structure: an outer sleeve member having an opening extending longitudinally therethrough; an operating cylinder and a control valve body telescoped into the opening in abutting relation, said body having a shiftable valve member therein and a motor port communicating with each end of said cylinder; a guide sleeve disposed in said outer sleeve in abutting relation with said valve body; an input member slideable in said guide sleeve and connected to said valve member; and end caps at opposite ends of said sleeve between which said cylinder, valve body and guide sleeve are maintained in said abutting relation and are retained in said opening.

7. In a servomotor and control valve structure: an outer sleeve member having an opening extending longitudinally therethrough; an operating cylinder telescoped into the opening so as to form with said sleeve an annular fluid passage leading to one end of the cylinder; a control valve body telescoped into the opening in abutting relation with the other end of the cylinder, said body having fluid sealing engagement with said sleeve to prevent leakage from said annular fluid passage, and fluid sealing engagement with said cylinder to prevent leakage therefrom; a pair of motor ports in said body, one communicating with said annular passage and the other communicating with said other end of the cylinder; and end caps at opposite ends of said sleeve between which said cylinder and valve body are maintained in said abutting relation and are retained in said opening.

8. In a servomotor and control valve structure: an outer sleeve member having an opening extending longitudinally therethrough; an operating cylinder telescoped into the opening so as to form with said sleeve an annular fluid passage leading to one end of the cylinder; a control valve body telescoped into the opening in abutting relation with the other end of the cylinder, said body having fluid sealing engagement with said sleeve to prevent leakage from said annular fluid paage, and fluid sealing engagement with said cylinder to prevent leakage therefrom; a pair of motor ports in said body, one communicating with said annular passage and the other communicating with said other end of the cylinder; a shiftable valve member in said body; a guide sleeve disposed in said outer sleeve in abutting relation with said valve body; an input member slideable in said guide sleeve and connected to said valve member; and end caps at opposite ends of said sleeve between which said cylinder, valve body and guide sleeve are maintained in said abutting relation and are retained in said opening.

9. In a servomotor and control valve structure: an outer sleeve member having an opening extending longitudinally therethrough; an operating cylinder, having a piston and rod therein, and a control valve body telescoped into the opening in abutting relation, said body having a motor port communicating with each end of said cylinder; and end caps secured to opposite ends of said sleeve, forming opposed abutments between which said cylinder and valve body are sandwiched, said end caps functioning to maintain said abutting relation and to retain said cylinder and valve body in said opening, one of said end caps having said rod extending therethrough to form an anchor connection, the other of said end caps forming an output connection member.

10. In a servomotor and control valve structure: an outer sleeve member having an opening extending longitudinally therethrough; an operating cylinder, having a piston and rod therein, and a control valve body telescoped into the opening in abutting relation, said body having a shiftable valve member therein and a motor port communicating with each end of said cylinder; a guide sleeve disposed in said outer sleeve in abutting relation with said valve body; an input member slideable in said guide sleeve and connected to said valve member, said input member having an arm extending laterally through the walls of said guide sleeve and said outer sleeve; and end caps at opposite ends of said sleeve between which said cylinder, valve body and guide sleeve are maintained in said abutting relation and are retained in said opening, one of said end caps having said rod extending therethrough to form an anchor connection, the other of said end caps forming an output connection member.

References Cited in the file of this patent

UNITED STATES PATENTS

| 2,194,209 | Mott | Mar. 19, 1940 |
| 2,340,817 | Martin-Hurst | Feb. 1, 1944 |
| 2,345,837 | Smith | Apr. 4, 1944 |
| 2,392,985 | Harbers | Jan. 15, 1946 |
| 2,487,618 | Twyman | Nov. 8, 1949 |
| 2,566,273 | Westbury | Aug. 28, 1951 |
| 2,676,663 | Smith | Apr. 27, 1954 |
| 2,698,006 | Wichmann et al. | Dec. 28, 1954 |

FOREIGN PATENTS

| 654,269 | Great Britain | June 13, 1951 |
| 725,920 | Great Britain | Mar. 9, 1955 |